Sept. 28, 1926.  W. W. WILDMAN  1,601,013
SELF SEALING INNER TUBE
Filed Feb. 15, 1924
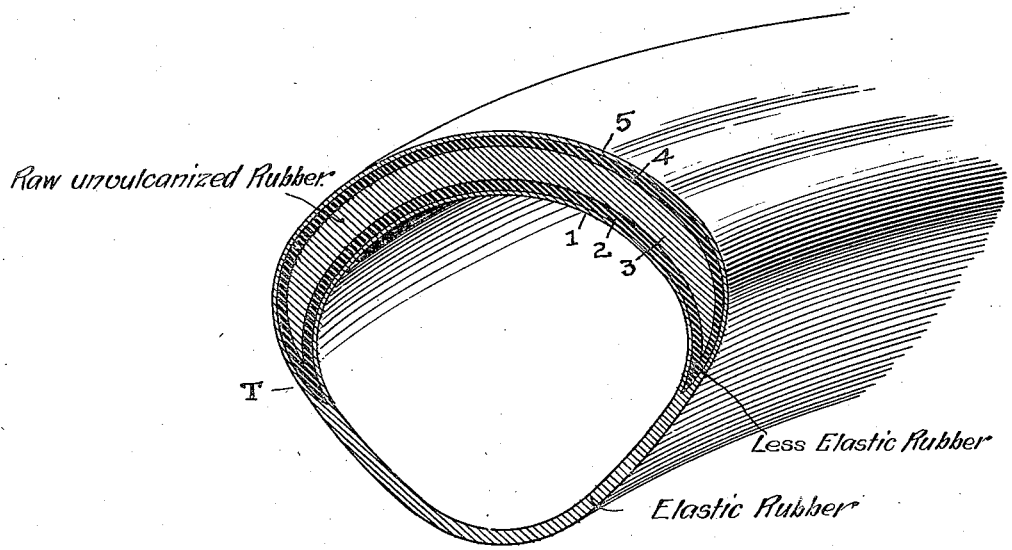
Inventor
W. W. WILDMAN
By Fisher, Moore & Moore
Attorneys Patented Sept. 28, 1926.

1,601,013

UNITED STATES PATENT OFFICE.

WILLIAM W. WILDMAN, OF BAY CITY, MICHIGAN, ASSIGNOR TO THE WILDMAN RUBBER COMPANY, OF BAY CITY, MICHIGAN, A CORPORATION OF DELAWARE.

SELF-SEALING INNER TUBE.

Application filed February 15, 1924. Serial No. 692,963.

My invention relates to pneumatic vehicle tires, and in general my object is to provide a self-sealing inner tube of special design and construction, and a practical commercial method of producing the same, all as hereinafter more particularly described and pointed out in the claims. Briefly stated, the tube is so constructed that when it is punctured by an object and the object is withdrawn, a certain amount of raw rubber will be caused to follow or be withdrawn with the object into the punctured opening and to the exterior to permanently seal the puncture; and this self-sealing tube and my present method of producing the same is an improvement over the tire tube and process disclosed in Letters Patent No. 1,217,888, granted to W. W. Wildman, et al on Feb. 27, 1917.

In the accompanying drawings, the single figure is a cross section and perspective view of a completed tire tube constructed according to my invention.

It should be understood at the outset that the completed tube is composed entirely of rubber and that the tread portion thereof, is built up of separate plies of rubber having different characteristics and properties, but all homogenously united together at their meeting surfaces by vulcanization. As delineated, the tube at its tread side comprises five plies or layers of rubber, 1, 2, 3, 4 and 5, respectively. The outer and inner plies 1 and 5, are composed of substantially the same vulcanizable stock; the rubber interlayers or plies 2 and 4 have like characteristics and properties but are composed of different vulcanizable stock than said outer and inner plies; and the central rubber core or middle ply 3 differs materially from all the other plies in that it is a strip composed of a mixture of raw gum without a vulcanizing ingredient therein. The outer and inner plies 1 and 5 are relatively thin; the interlayers or plies 2 and 4 are relatively thicker than the inner and outer plies 1 and 5; and the middle strip or ply 3 is relatively much thicker and heavier than the others and tapered or made thinner at its border edges. The interlayers 2 and 4, and also the middle strip 3 may be built up to the desired thickness by superposing thin calendered pieces of the desired kind of rubber upon each other, or each of said strips may be produced by extruding a mixture of the desired composition in the exact size and shape required from a machine corresponding to a known type used for extruding rubber tubes.

The outer and inner plies 1 and 5 may be composed of the materials commonly used in producing what may be termed regular or ordinary inner tube stock, having free stretching or elastic qualities and good wearing properties, whereas the rubber interlayers 2 and 4 are made of heavily compounded rubber stock having greater resistance to stretch and penetration than plies 1 and 5. Middle strip 3, as herebefore stated, is still a different mixture which remains sticky and tacky after vulcanization. Thus, as an exemplification of different mixtures or compositions which I may use in carrying out my invention in a practical commercial way to produce a very desirable product, I may make the stock for the outer and inner plies 1 and 5 of a preponderating amount of smoked sheet rubber and so-called Latex rubber, with a lesser percentage of master batch rubber, and small percentages of zinc oxide, cotton seed oil, and sulphur. The master batch rubber consists of primed ribbed smoked sheet rubber and a mixture for hastening the curing or vulcanization of the rubber. However, and inasmuch as different standard mixtures may be used for the inner and outer plies, I do not wish to limit myself to the exact compositions above described, providing it is a vulcanizable mixture and produces a free stretching and durable coating or ply for the inside and outside of the tube.

The interlayers 2 and 4 differ in composition from plies 1 and 5 in that they are made of a stiffer mixture containing a lesser amount of crude rubber and possessing the property of being more resistant or harder to stretch when vulcanized, and a composition which may be used to attain my object may consist of approximately thirty-five per cent of smoked sheet rubber, sixteen per cent of pale and brown crepe rubber, five per cent of master batch rubber which as hereinbefore stated contains a vulcanizing or curing mixture, three per cent of mineral rubber, eighteen per cent of carbon black, three per cent of cotton seed and palm oil, sixteen to seventeen per cent of zinc oxide, one to two per cent of magnesia, and two to three per cent of sulphur.

The sealing filler or middle strip 3 may be a mixture composed of twenty-five per cent of Mexican guayule rubber and seventy-five per cent of primed ribbed smoked sheet rubber milled to a consistent density without the admixture of a vulcanizing or curing ingredient so that it will possess firmness and coherence with a limited amount of plasticity and a high degree of adhesiveness after the surrounding plies of rubber have been vulcanized.

In vulcanizing a tube composed of sheets and strips of rubber of the different compositions described, the self-sealing mixture of strip 3 is not vulcanized except at its meeting surfaces with the enveloping plies or strips 2 and 4, respectively, where a certain amount of the sulphur or vulcanizing ingredient is absorbed from strips 2 and 4 to unite the three strips firmly together. When vulcanization of the tube is completed the self-sealing stock of strip 3 is encased in an air tight envelope or casing, comprising the two plies 2 and 4 of stiff rubber and the inner and outer plies 1 and 5 of more elastic rubber. Thus, both in manufacture and use, the raw gum of strip 3 is isolated from the air used to inflate the tube and will not deteriorate or be affected thereby. The tube is also preferably made oversize or practically the full size of the inside of the tire casing with which it is intended to be used, so that when the tube is inflated for road use there will be very little stretch on the rubber tube itself, actual tests of long duration showing that such tubes will outwear several sets of tire casings.

In building up the tube the three plies 2, 3 and 4 may be pre-assembled and applied as a composite strip upon ply 1, and each of the plies 2, 3 and 4 may be made of several thin calendered strips and built up to a crescent shape, but these strips are preferably made in an extruding machine as hereinbefore mentioned. The thickness of each ply may vary depending upon the size of the tube or thickness of wall desired. The tube can be made on a straight mandrel and vulcanized before stripping it therefrom and joining the ends together by splicing and cementing steps, but less operations are required and certain advantages accrue in molding the tube of the same true circular shape as the casing and also a shape corresponding exactly to the cross section of the cavity or inner walls of the casing, and in making the tube in this way the inner and outer plies 1 and 5 may be shaped while the rubber is in an unvulcanized state and adapted to be readily fitted to the mold to produce a wall of uniform thickness without buckles or folds at the inner circumference of the tube, and the finished tube can also be properly placed within a tire casing without twist or distortion as the fin or flash at the inner circumference made in molding the tube within a sectional mold will show any distortion or improper placement of the tube within the tire casing. When a tube of this kind is punctured by a nail or other object and the nail or object is pulled out, a small amount of the raw crude rubber of strip 3 is extruded or drawn outwardly through plies 4 and 5 and then the stiffer or more inelastic rubber acts to close and seal the opening or hole. The thickened tread being made entirely of rubber with a soft rubber core it provides a very firm but resilient support adapted to co-act with a high degree of efficiency with the tire casing in supporting the load.

What I claim, is:

1. A self-sealing inner tire-tube composed entirely of rubber, consisting of an inner lining and an outer sheath of flexible rubber, interlayers of thicker strips of less elastic rubber vulcanized to said lining and sheath, and a thick strip of raw unvulcanized rubber confined completely between the side edges of said strips.

2. A self-sealing inner tube, comprising three strips of rubber confined between an inner tube and an outer tube of rubber, the middle strip being composed of raw unvulcanized rubber, the two remaining strips and the tubes being composed of vulcanized rubber, and the composition of the strips facing the raw rubber strip containing a lesser percentage of crude rubber than the composition of the inner and outer tubes.

In testimony whereof I affix my signature.

WILLIAM W. WILDMAN.